June 18, 1946.   J. LEDWINKA   2,402,501
RAILWAY TRUCK
Filed Oct. 30, 1943   2 Sheets-Sheet 1

INVENTOR
Joseph Ledwinka
BY John P. Tarbet
ATTORNEY

June 18, 1946.　　　　J. LEDWINKA　　　　2,402,501
RAILWAY TRUCK
Filed Oct. 30, 1943　　　　2 Sheets-Sheet 2

INVENTOR
Joseph Ledwinka.
BY John P. Tarbox
ATTORNEY

Patented June 18, 1946

2,402,501

UNITED STATES PATENT OFFICE 2,402,501

RAILWAY TRUCK

Joseph Ledwinka, Philadelphia, Pa., assignor to Edward G. Budd Manufacturing Company, Philadelphia, Pa., a corporation of Pennsylvania Application October 30, 1943, Serial No. 508,323

8 Claims. (Cl. 105—208.1)

The invention relates to a railway truck and more particularly to a truck built of high-strength sheet material such as highly cold rolled stainless sheet steel.

Among the objects of the invention is a truck of the indicated type which is light in weight, durable and sturdy and which has good riding qualities and a favorable ratio of the sprung weight to the unsprung weight.

The objects of the invention are mainly achieved by a truck frame having side members or arch bars supported from the wheels and resiliently interconnected by spring supported transoms or an H-bar.

The springs between the side members of the frame and its transoms are preferably of the rubber sandwich or slab type and are arranged so as to transmit longitudinal and transverse thrusts in addition to the load.

Further objects, features and details of the invention will become apparent from the embodiment illustrated in the attached drawings and described in the following:

Figure 1:
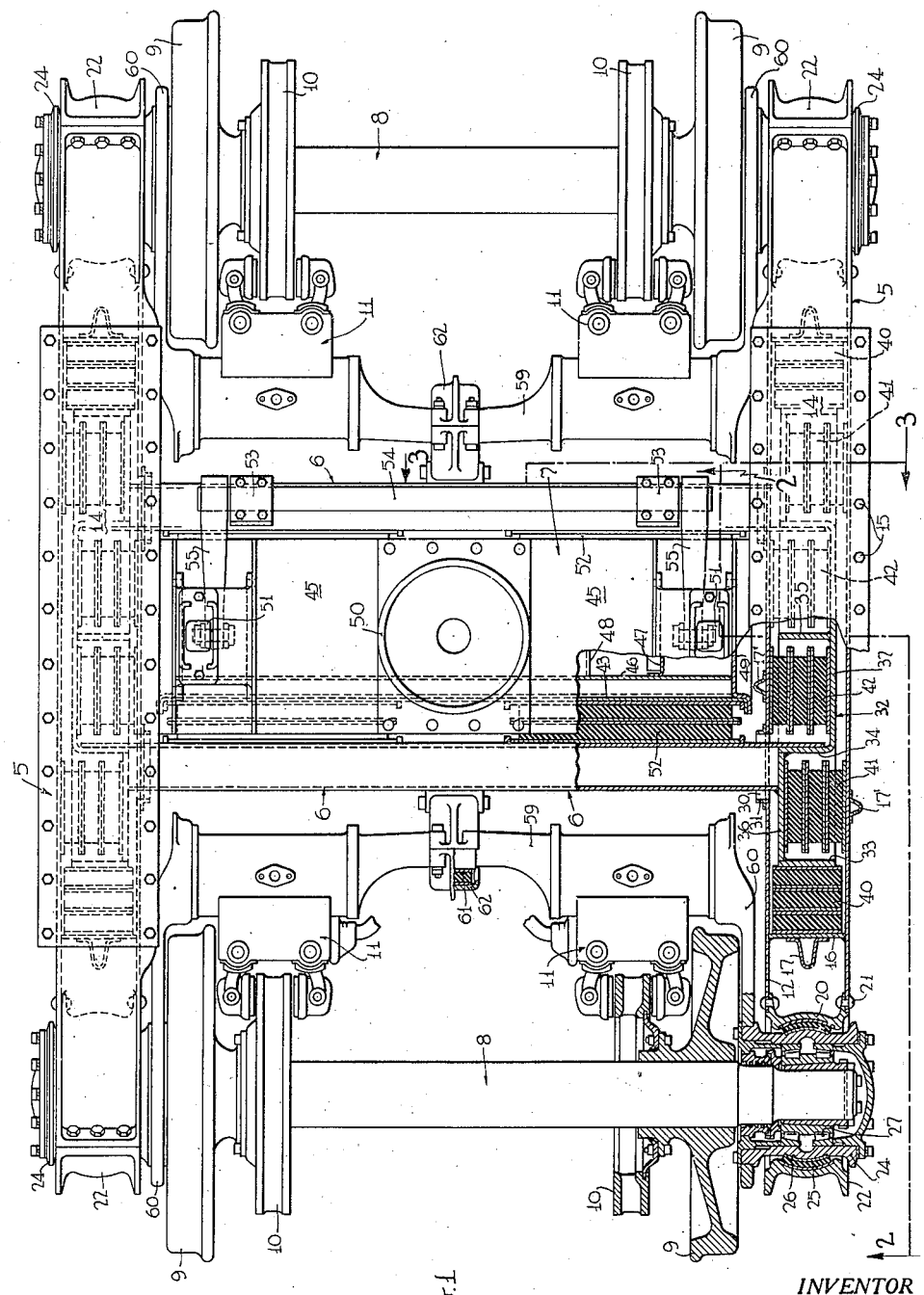
Fig. 1 is a plan view of a truck partly in section along line 1—1 of Fig. 2.
Figure 2:
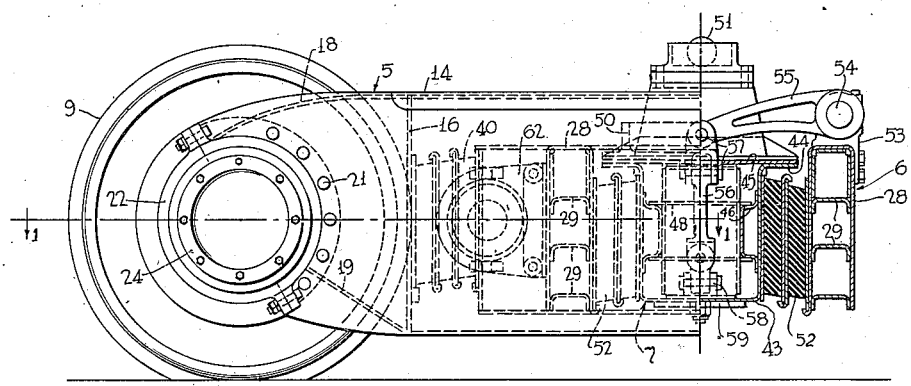
Fig. 2 is a fragmentary side elevation of the truck partly in section along line 2—2 of Fig. 1.
Figure 3:
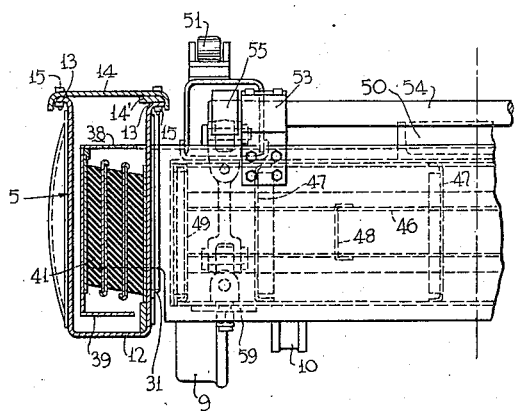
Fig. 3 is a transverse section substantially along line 3—3 of Fig. 1.

The truck frame consists of the following main elements. The two side frames 5, a pair of transoms 6, a bolster 7, a pair of axles 8 with wheels 9 and brake discs 10, and braking devices 11.

Each side frame consists of a deep and comparatively narrow U-section member 12 having marginal flanges 13 to which a top cover plate 14 reinforced on its inner side by strip 14' is removably secured by screw bolts and nuts 15. The channel 12 is closed near each end by a transverse wall 16 which is welded to the walls of the member 12 and reinforced by a strip 17. The side walls are similarly reinforced by strips 17'. The cover plate 14 ends near the wall 16 and its place is taken at the ends of the truck by a plate 18 welded to the member 12. The bottom wall of the member 12 is in the region outside of the wall 16 raised at 19 with respect to the lower margins of the side walls of the member 12 in the same region and is welded to the side walls.

The ends of the side walls of the members 12 are provided with half circular recesses into which one-half 20 of a bracket fits with marginal flanges and is secured by rivets 21. The other half 22 of the wheel supporting bracket is secured to the first named half 20 by screw bolts and nuts 23.

The brackets 20, 22 support the axle boxes 24 by means of rubber cushions 25 vulcanized to spherical or globular shaped metal plates 26. The axle 8 is supported in the axle box by anti-friction bearings 27. The cushions 25 permit limited angular and transverse movement of the axle relative to the side frames; this is important in connection with the transverse connection between the side frames now to be described.

Each transom 6 consists of an inverted deep but narrow U-section member 28 which is closed and reinforced by shallow U-section members 29 arranged in its interior and welded to its side walls. The ends of the transom 6 extend each through an opening 30 in the inner side wall of the side frame member 12. The margins of openings which are larger than the cross section of the transom 6, are each reinforced by a welded-on strip 31. The openings 30 are defined on three sides only by the members 12 whereas the fourth side is formed by removable top plates 14 so as to allow the insertion or removal of the transoms. The ends of the transom in the interior of each side frame are secured by welding to a structure 32 which has in horizontal section transverse walls 33, 34, 35 and longitudinal walls 36, 37. The upper and lower margins of said walls are interconnected by a top plate 38 and a bottom plate 39 so that four laterally open boxes are formed, the end ones facing outwardly and the middle ones inwardly.

Six sandwich rubber springs or slabs 40, 41, 42 are inserted between each side member 12 and end structure 32 of the transoms 6 on each side of the truck. The rubber slabs 40 are inserted and attached by their end plates to the walls 16 and 33 respectively and arranged at right angles to the springs 41, 42; the slabs 41 are inserted between the outer wall of the side frame member 12 and the wall portions 36 of the end structure 32 of the transom; and the slabs 42 are inserted between the inner wall of the member 12 and the wall portion 37 of the structure 32. In the region of the spring attachment the walls of the side frame are reinforced by the above mentioned strips 17, 17'.

It is evident that the just described spring arrangement supports the transom structure 6, 32 resiliently on the truck side frames 5 stressing the rubber slabs in shear and resiliently transmits horizontal forces in longitudinal and transverse directions stressing the slabs in compression.

The bolster 7 comprises a U-section member 43 with lateral flanges 44 and a top plate 45 secured to said flanges. The side walls of the member 43 are reinforced by flanged U-section members 46. The bolster is furthermore interiorly reinforced by flanged bulkheads 47 and members 48. The ends of the bolster are closed and reinforced by end walls 49. A center pin bearing 50 and side bearings 51 are supported by the top of the bolster and are secured to it. It will be noted that the reinforcing walls or bulkheads 47 and 49 are arranged at the location of the center and side bearings.

Two pairs of sandwich rubber springs or slabs 52 are inserted between and secured to the opposing walls of the transoms 6 and the bolster 7 so as to resiliently support the bolster and to transmit longitudinal stresses. At the same time the slabs allow lateral swinging of the bolster which is limited by rubber bumpers (not shown). No wear plates are necessary and the need for lubrication is eliminated.

One of the transoms 6 carries on its top bearings 53 for a torsion stabilizer rod or sway bar 54. Rigidly secured to each end of the rod 54 are arms 55. The ends of the arms 55 are attached by links 56 and universal joint connections 57 and 58 to the bottom wall of bolster member 43 which is reinforced in these regions by plates 59. The torsion or sway bar prevents excessive lateral tilting.

Each brake unit 11 comprises a transversely extending bar 59, which may partly be formed by the brake cylinders, and longitudinal extending arms 60 at its ends. The arms 60 are rigidly secured to the axle boxes 24 whereas the central portion of the bar 59 is supported by means of a rubber pad or sleeve 61 in a bracket 62 attached to the adjacent transom 6. This arrangement eliminates the usual bearings at the axle boxes. The brake supporting structure 59, 60 becomes a rigid part of the axle and axle box unit 8, 24 and is permitted to participate in the movements of the axle relative to the side frames on account of the resiliency of the rubber pad 61. The rubber pad 61 acts again as a barrier against transmission of noise and other vibrations from the wheels to the bolster and thence to the body.

As indicated before, the transom is assembled with the side frames by lowering its ends into the members 12 of the side frames whereupon the open top of the side frame is closed by the cover plate 14 which after its fastening forms a structural load transmitting part of the side frame. An advantage of this construction is also that the springs are well protected within the side frames and entirely excluded from sunshine which is desirable.

After the attachment of the top plate 14, the transom structure is safely held or anchored to the side frames yet allowing any of the wheels to be lifted up separately, giving flexibility and freedom on uneven tracks.

On account of the described and illustrated placing of the rubber springs and inserts all vertical, lateral, and fore and aft movements are taken up by rubber and therefore no wear plates are required, as on the customary trucks. This disposes of wear as well as of lubrication and at the same time prevents transfer of noises and other vibrations. It will be noted that there are three barriers against noise and vibrations between each axle box and the bolster in the form of the rubber cushions 25 and the rubber springs 40, 41, 42 and 52 and that there are furthermore two barriers between the brake unit 11 and the bolster in the form of the rubber cushion 61 and the springs 52.

The rubber springs 40, 41, 42 enclosed in the side frame members may take for instance ⅔ of the required deflection whereas the remainder of the deflection is taken by the springs 52.

While in the foregoing sometimes one side or quarter only of certain structures has been described it will be understood that the truck is substantially symmetrical with respect to its longitudinal and transverse center lines for the sway bar. The truck frame, the transom and the bolster are preferably made of sheet metal and more specifically of high-tensile stainless steel whereas other portions such as axles, axle boxes, brake units and brackets may be of such materials as are customary for such structures. It will also be understood that, although the term "rubber" has been used throughout this description and the attached claims for the resilient inserts or springs, other materials having the required characteristics, such as the materials collectively termed "synthetic rubber," may be used without departing from the invention.

The invention is of course not restricted to the illustrated and described embodiment but the attached claims are intended to cover all those modifications and adaptations which will occur to those skilled in the art.

What is claimed is:

1. A truck frame especially for rail cars comprising two closed section hollow side frame members and a transom structure, resilient means connecting the ends of the transom structure with the side frame members so as to permit cushioned limited vertical and transverse movement of the side frame members relative to the transom structure and to each other, said resilient means being arranged within the interior of said side frame members, end portions of the transom structure being likewise arranged within the interior of the side frame members and being connected with the central portion of the transom structure through openings provided in the inboard walls only of the side frame members.

2. In a truck frame especially for rail cars, two side frame members and a transom structure, a plurality of sets of about vertically arranged rubber sandwich springs or slabs inserted between the ends of the transom structure and the side frame members, certain of said rubber slabs being arranged at right angles to other slabs so that the load stresses the rubber in shear whereas transverse and longitudinal movements stress at least some of the rubber in compression.

3. In a railway truck, two side frames and a transom structure, rubber slabs or sandwiches between said side frames and said transom structure, said rubber slabs being arranged so as to be stressed in shear by the load, at least four rubber sandwiches or slabs being arranged between each end of the transom structure and the adjacent side frame, one rubber sandwich or slab each being arranged between a forwardly facing wall of the transom structure, a rearwardly facing wall, an outwardly facing wall and an inwardly facing wall of the transom structure, on the one hand, and juxtaposed wall portions of the side frame, on the other hand.

4. Truck, especially railway truck comprising two side frame members interconnected by a first set of rubber sandwich springs and a transom structure, the rubber sandwiches being arranged so as to be stressed in shear by the load, a bolster and a second set of rubber sandwich springs between the transom structure and said bolster so that part of the required deflection is taken by the rubber springs between the side frame members and the transom structure and another part by the rubber springs between the transom structure and the bolster.

5. In a truck especially for railways, a pair of hollow section side frame members and a transom structure, said transom structure comprising at least one transverse beam connected at its ends to longitudinally extending structures, said longitudinally extending structures being in the form of laterally inwardly and outwardly facing open boxes, said beam extending through openings in the inner walls of the side frame members and said longitudinally extending structures being arranged in the interior of the side frame structures, springs of the rubber sandwich or slab type being attached to the walls of said boxes and at least some of them being arranged in the interior thereof.

6. In a railway truck, a pair of hollow section side frame members and a transom structure, said transom structure comprising two longitudinally spaced transverse beams interconnected at their ends by longitudinally extending structures, said longitudinally extending structures being in the form of laterally inwardly and outwardly facing open boxes, said beams extending through openings in the inner walls of the side frame members and said longitudinally extending structures being arranged in the interior of the side frame structures, springs of the rubber sandwich or slab type being attached to the walls of said boxes and at least some of them being arranged in the interior thereof.

7. In a truck especially for railways, two pairs of wheels, means supported by said wheels, a transverse structure, a plurality of sets of generally vertically arranged rubber sandwich springs or slabs inserted between the ends of the transverse structure and said wheel supported means, certain of said rubber slabs being arranged at right angles to other slabs so that the load stresses the rubber in shear whereas transverse and longitudinal movements stress at least some of the rubber in compression.

8. In a truck according to claim 7, certain of said springs being arranged generally in and others generally at right angles to the longitudinal direction of the truck.

JOSEPH LEDWINKA.